United States Patent
Jung

(10) Patent No.: US 11,023,518 B2
(45) Date of Patent: Jun. 1, 2021

(54) METHOD AND SYSTEM FOR MAP IMAGE SEARCH USING CONTEXT OF IMAGE

(71) Applicant: NAVER CORPORATION, Seongnam-si (KR)

(72) Inventor: Jeanie Jung, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 227 days.

(21) Appl. No.: 15/609,907

(22) Filed: May 31, 2017

(65) Prior Publication Data
US 2017/0351712 A1  Dec. 7, 2017

(30) Foreign Application Priority Data
Jun. 2, 2016 (KR) .................. 10-2016-0068590

(51) Int. Cl.
*G06F 16/20* (2019.01)
*G06F 16/58* (2019.01)
*G06F 16/29* (2019.01)
*G06F 16/532* (2019.01)
*G06F 16/583* (2019.01)

(52) U.S. Cl.
CPC .......... *G06F 16/5866* (2019.01); *G06F 16/29* (2019.01); *G06F 16/532* (2019.01); *G06F 16/5838* (2019.01)

(58) Field of Classification Search
CPC ............. G06F 16/5866; G06F 16/5838; G06F 16/532; G06F 16/29
See application file for complete search history.

(56) References Cited

U.S. PATENT DOCUMENTS

| | | | | |
|---|---|---|---|---|
| 2009/0082958 A1* | 3/2009 | Ishii | ................. | G01C 21/20 701/438 |
| 2009/0106699 A1* | 4/2009 | Kihara | ................. | G06F 3/04817 715/838 |
| 2010/0156933 A1* | 6/2010 | Jones | ................. | G06Q 30/02 345/629 |
| 2010/0293173 A1* | 11/2010 | Chapin | ................. | G06F 16/9537 707/759 |

(Continued)

FOREIGN PATENT DOCUMENTS

| | | |
|---|---|---|
| JP | 05094478 A | 4/1993 |
| JP | 2003067386 A | 3/2003 |

(Continued)

OTHER PUBLICATIONS

Korean Office Action dated Sep. 29, 2017 by the Korean Patent Office corresponding to Korean patent application No. 10-2016-0068590.

(Continued)

*Primary Examiner* — Tarek Chbouki
(74) *Attorney, Agent, or Firm* — Greer Burns & Crain Ltd.

(57) ABSTRACT

Provided is a method and system for performing a map image search based on the context of an image. A map image search method may include receiving a query for a map image search; searching for a map image corresponding to the query using context that is acquired as an image analysis result of the map image; and providing a service or content using the map image corresponding to the query.

13 Claims, 8 Drawing Sheets

(56) References Cited

U.S. PATENT DOCUMENTS

| | | | |
|---|---|---|---|
| 2011/0072048 A1* | 3/2011 | Hua | G06F 16/24578 707/780 |
| 2011/0282570 A1* | 11/2011 | Tanioka | G01C 21/3623 701/532 |
| 2012/0007885 A1* | 1/2012 | Huston | H04W 4/029 345/633 |
| 2012/0035963 A1* | 2/2012 | Qian | G06Q 50/24 705/3 |
| 2012/0226531 A1* | 9/2012 | Lee | G06Q 30/00 705/14.4 |
| 2014/0282113 A1* | 9/2014 | Cronin | H04N 7/157 715/757 |
| 2014/0297575 A1 | 10/2014 | Rapoport et al. | |
| 2014/0330814 A1* | 11/2014 | Li | G06F 16/248 707/722 |
| 2015/0161147 A1* | 6/2015 | Zhao | G06F 16/438 707/772 |
| 2015/0169754 A1* | 6/2015 | Gu | G06F 16/5838 707/728 |
| 2015/0186414 A1* | 7/2015 | Jones | G06F 16/29 707/723 |
| 2015/0278878 A1* | 10/2015 | Chau | G06Q 30/0276 705/14.72 |
| 2015/0310012 A1* | 10/2015 | Kim | G06F 16/434 707/722 |
| 2015/0317357 A1* | 11/2015 | Harmsen | G06N 5/025 707/723 |
| 2016/0140146 A1* | 5/2016 | Wexler | G06K 9/18 707/741 |
| 2016/0140147 A1* | 5/2016 | Sun | G06F 16/5854 |
| 2016/0300386 A1* | 10/2016 | Bostick | G11B 27/30 |
| 2017/0301104 A1* | 10/2017 | Qian | G01S 17/89 |

FOREIGN PATENT DOCUMENTS

| | | |
|---|---|---|
| JP | 2005276004 A | 10/2005 |
| JP | 2014534540 A | 12/2014 |
| JP | 2015001760 A | 1/2015 |
| KR | 2002-0003110 A | 1/2002 |
| KR | 20120067830 A | 6/2012 |
| KR | 2012-0076570 A | 7/2012 |
| KR | 2013-0088745 A | 8/2013 |
| KR | 2014-0054940 A | 5/2014 |
| KR | 2015-0015062 A | 2/2015 |

OTHER PUBLICATIONS

Japanese Office Action dated May 29, 2018 by the Japanese Patent Office corresponding to Japanese patent application No. 2017-107762.

Japanese Office Action dated Oct. 2, 2018 by the Japanese Patent Office corresponding to Japanese patent application No. 2017-107762.

* cited by examiner

501 — Query : Wall of Seoul Nowon-gu with scribbled writing

Search results:

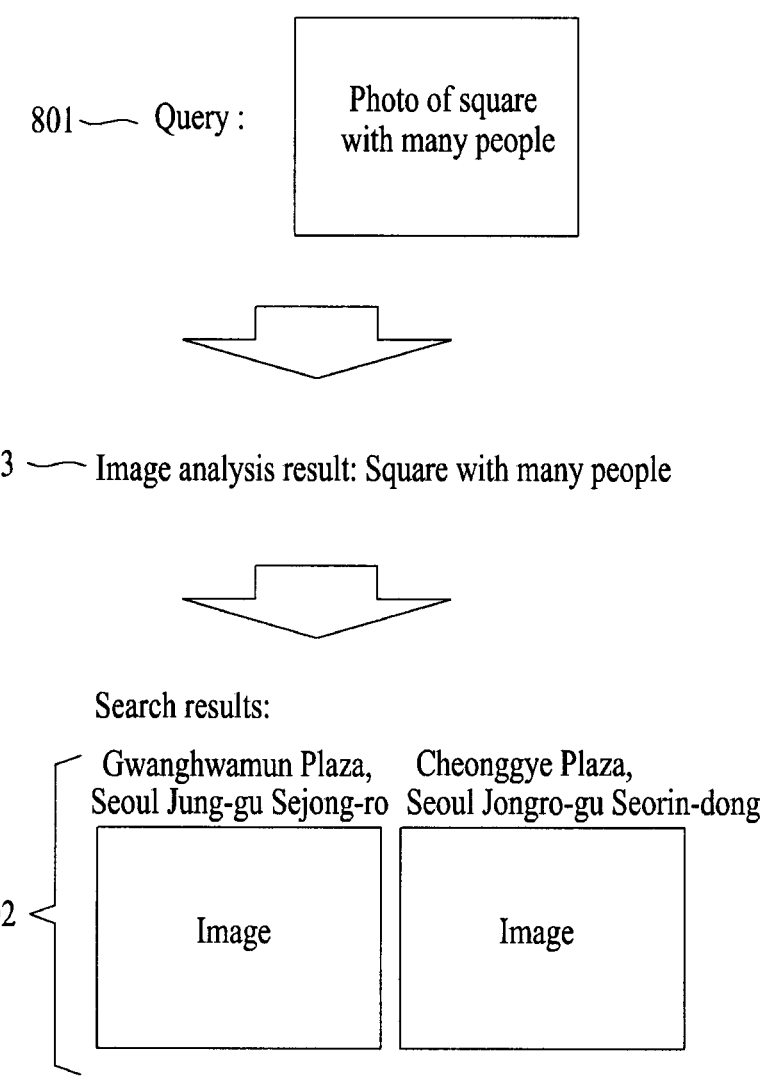

METHOD AND SYSTEM FOR MAP IMAGE SEARCH USING CONTEXT OF IMAGE

CROSS-REFERENCE TO RELATED APPLICATION(S)

This application claims priority under 35 U.S.C. § 119 to Korean Patent Application No. 10-2016-0068590 filed on Jun. 2, 2016, in the Korean Intellectual Property Office (KIPO), the entire contents of which are incorporated herein by reference.

BACKGROUND

Field

One or more example embodiments of the present invention relate to technology for searching for a map image.

Description of Related Art

Currently, a map service is provided in various environments through convergence of Internet communication technology, satellite positioning technology, map information technology, search engine technology, and the like.

In general, the map service may provide a map of a region requested from a user based on a predetermined scale. The map service is provided at a portal search service and is used by many users as a search tool.

Also, a map service based on a geographic information system (GIS) is provided using a terminal, for example, a navigation system and the like, in a mobile environment.

For example, Korean Patent Publication NO. 10-2012-0067830, published on Jun. 26, 2012, discloses technology for providing a map service on a web browser through the Internet in a mobile environment.

SUMMARY

One or more example embodiments provide a method and system that may search for a map image, such as a street view and the like, based on the context of an image.

According to an aspect of at least one example embodiment, there is provided a map image search method performed by a map image search system configured as a computer, the method including receiving a query for a map image search; searching for a map image corresponding to the query using context that is acquired as an image analysis result of the map image; and providing a service or content using the map image corresponding to the query.

The map image search method may further include receiving image information acquired from each map image using an image analysis technique. The searching may include searching for a map image of which the image information corresponds to the query.

The map image may be an image provided as a panorama.

The map image may be an image provided as a street view.

The receiving of the query may include receiving one of a keyword combined with location information, a keyword prepared as a sentence, and an image as the query.

The searching may include searching for a map image of which location information corresponds to location information input as the query, in response to a keyword combined with the location information being input as the query.

The searching may include searching for a map image of which an image analysis result corresponds to an image object feature included in a keyword in which a text indicating the location information and a text indicating the image object feature are combined based on location information included in the keyword, in response to the keyword being input as the query.

The searching may include searching for a map image of which the context corresponds to a sentence, in response to a keyword prepared as the sentence being input as the query.

The searching may include searching for a map image of which an image analysis result corresponds to an image object feature included in a keyword prepared as a text indicating the image object feature, in response to the keyword being input as the query.

The searching may include searching for a map image corresponding to the context of an image input as the query or a map image similar to the image input as the query through matching between images, in response to the image being input as the query.

The providing may include providing the map image corresponding to the query as a background environment of a virtual reality.

The providing may include providing the map image corresponding to the query as advertising content.

The providing may include providing the map image corresponding to the query by including advertising content associated with the query in the map image.

According to an aspect of at least one example embodiment, there is provided a non-transitory computer-readable medium storing computer-readable instructions. When executed by a processor, the computer-readable instructions control a computer system to implement a map image search method including receiving a query for a map image search; searching for a map image corresponding to the query using context that is acquired as an image analysis result of the map image; and providing a service or content using the map image corresponding to the query.

According to an aspect of at least one example embodiment, there is provided a map image search system configured as a computer, including a query input controller configured to control the map image search system to receive a query for a map image search; an image searcher configured to search for a map image corresponding to the query using context that is acquired as an image analysis result of the map image; and a search result provider configured to provide a service or content using the map image corresponding to the query.

The map image search system may further include an information input controller configured to control the map image search system to receive image information acquired from each map image using an image analysis technique. The image searcher may be configured to search for a map image of which the image information corresponds to the query.

The map image may be an image provided as a street view.

The query input controller may be configured to receive one of a keyword combined with location information, a keyword prepared as a sentence, and an image as the query.

The image searcher may be configured to search for a map image of which an image analysis result corresponds to an image object feature included in a keyword prepared as a text indicating the image object feature, in response to the keyword being input as the query.

The image searcher may be configured to search for a map image of which an image analysis result corresponds to an image object feature included in a keyword in which a text indicating the location information and a text indicating the image object feature are combined based on location information included in the keyword, in response to the keyword being input as the query.

According to some example embodiments, it is possible to provide and use further various and detailed map search environments by searching for a map image, such as a street view, based on a variety of information included in an image analysis result.

Also, according to some example embodiments, it is possible to search for a map image corresponding to a detailed situation or characteristic based on an image analysis result of a map image, and to use an image provided at a map service in various fields, for example, a background environment of virtual reality, advertising content, and the like.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIGS. 4 through 8 illustrate examples of a map image search according to at least one example embodiment.

Figure 1:
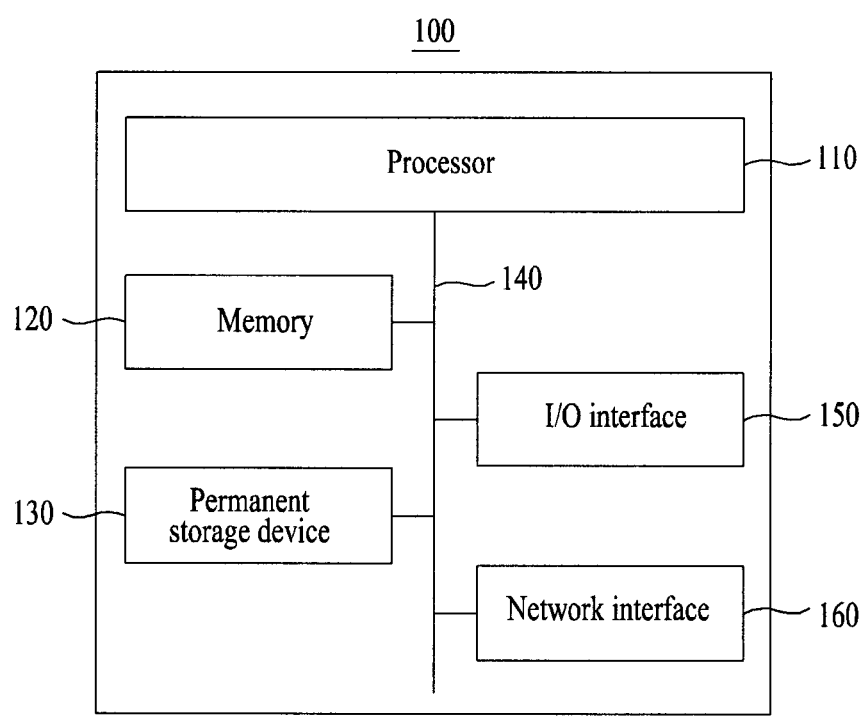
FIG. 1 is a diagram illustrating an example of a configuration of a computer system according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for searching for a map image, and more particularly, to a method and system for searching for a map image of a street view, an aerial view, and the like, based on the context of an image.

The example embodiments that include the disclosure herein may achieve a context-based map image search and, through this, may achieve various advantages, for example, diversity, efficiency, accuracy, cost reduction, and the like.

A map image of a street view may be provided as a panoramic photo and contain vivid and various views of an actual region, and is used as an auxiliary means to verify a corresponding location from a map search result.

Herein, when searching for a street view of a specific region, a map image may be retrieved as search results using a lot number, an address, or a point of interest (POI). Also, the map image may be retrieved using a variety of image information. When searching for a map image based on the context of an image itself, it is possible to discover a map image and a location corresponding to various and detailed context. In addition, with the supply of a virtual reality (VR) environment, the map image of the street view may be used as a background environment of virtual reality. Here, a user may easily search for a desired place based on virtual reality.

FIG. 1 is a block diagram illustrating an example of a computer system according to at least one example embodiment. For example, a map image search system according to example embodiments may be configured through a computer system 100 of FIG. 1. Referring to FIG. 1, the computer system 100 may include a processor 110, a memory 120, a permanent storage device 130, a bus 140, an input/output (I/O) interface 150, and a network interface 160 as components for implementing a map image search method.

The processor 110 may include an apparatus capable of processing a sequence of instructions or may be a portion thereof. The processor 110 may include, for example, a computer processor, or a processor and/or a digital processor within another electronic device. The processor 110 may be included in, for example, a server computing device, a server computer, a series of server computers, a server farm, a cloud computer, a content platform, a mobile computing device, a smartphone, a tablet, a set-top box, a media player, and the like. The processor 110 may be connected to the memory 120 through the bus 140.

The memory 120 may include a volatile memory, a permanent memory, a virtual memory, and/or another memory to store information used by the computer system 100 or output from the computer system 100. The memory 120 may include, for example, random access memory (RAM) and/or dynamic random access memory (DRAM). The memory 120 may be used to store predetermined information, such as state information of the computer system 100. The memory 120 may be used to store instructions of the computer system 100 including, for example, instructions for a map image search. If necessary or if appropriate, the computer system 100 may include at least one processor 110.

The bus 140 may include a communication-based structure that enables interaction between various components of the computer system 100. The bus 140 may transfer data between components of the computer system, for example, between the processor 110 and the memory 120. The bus 140 may include wireless and/or wired communication media between components of the computer system 100, and may include parallel, serial, and/or other topology arrangements.

The permanent storage device 130 may include components, such as the same memory as one used by the computer system 100 or another permanent storage device, to store data during a predetermined extended period, for example, compared to the memory 120. The permanent storage device 130 may include a non-volatile main memory used by the processor 110 of the computer system 100. The permanent storage device 130 may include, for example, a flash memory, a hard disk, an optical disc, and/or another computer-readable media.

The I/O interface 150 may include interfaces associated with a keyboard, a mouse, a voice command input, a display, and/or another input or output device. Instructions and/or input for the map image search may be received through the I/O interface 150.

The network interface 160 may include at least one interface for networks, such as a near-field network, the Internet, and the like. The network interface 160 may include interfaces for wired and/or wireless accesses. A service or content associated with instructions and/or a map image may be received through the network interface 160.

According to other example embodiments, the computer system 100 may include a greater or lesser number of components than the number of components shown in FIG. 1. However, there is no need to clearly illustrate many components according to the related art. For example, the computer system 100 may include at least a portion of I/O devices connected to the I/O interface 150 or may further include other components, for example, a transceiver, a global positioning (GPS) module, a camera, a variety of sensors, a database, and the like. In detail, when the computer system 100 is configured in a form of a mobile device such as a smartphone, the computer system 100 may further include other components, for example, an accelerometer sensor, a gyro sensor, a camera, various types of buttons, a button using a touch pane, an I/O port, a vibrator for vibration, etc., which are generally included in the smartphone.

Figure 2:
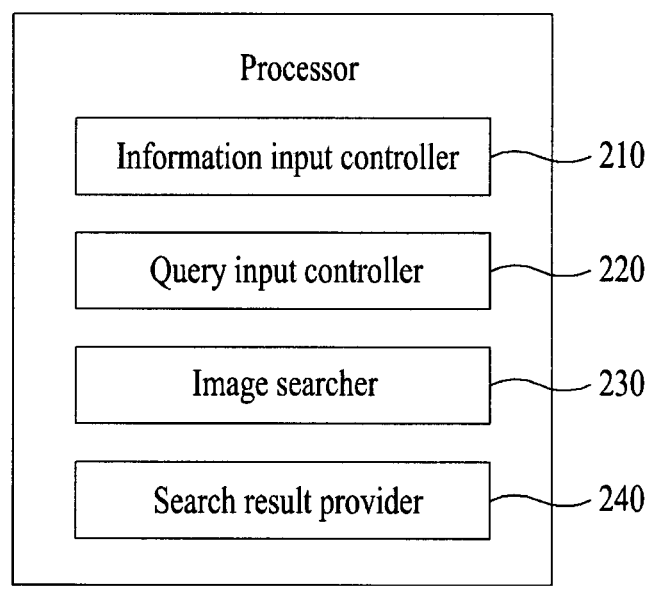
FIG. 2 is a block diagram illustrating an example of components includable in a processor of a computer system according to at least one example embodiment.
Figure 3:
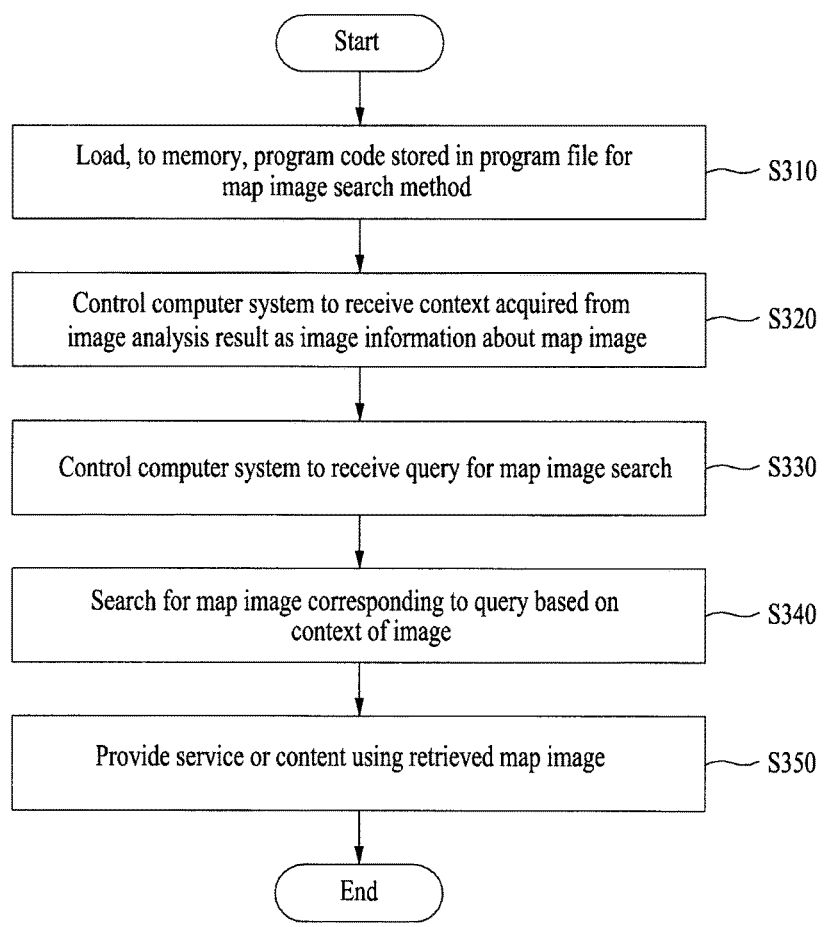
FIG. 3 is a flowchart illustrating an example of a map image search method performed at a computer system according to at least one example embodiment.

FIG. 2 is a block diagram illustrating an example of components includable in a processor of a computer system according to at least one example embodiment, and FIG. 3 is a flowchart illustrating an example of a map image search method performed at a computer system according to at least one example embodiment.

Referring to FIG. 2, the processor 110 includes an information input controller 210, a query input controller 220, an image searcher 230, and a search result provider 240. These components of the processor 110 may be representations of different functions performed by the processor 110 in response to a control instruction provided by at least one program code. For example, the query input controller 220 may be used as a functional representation for the processor 110 to control the computer system 100 to receive a query for a map image search. The processor 110 and the components of the processor 110 may be configured to perform operations S310 through S350 included in the map image search method of FIG. 3. For example, the processor 110 and the components of the processor 110 may be configured to execute instructions according to the at least one program code and a code of an OS included in the memory 120. Here, the at least one program code may correspond to a code of a program configured to process the map image search method.

The map image search method may not be performed in the illustrated sequence. A portion of the operations may be omitted from or an additional process may be further included in the map image search method.

In operation S310, the processor 110 may load, to the memory 120, a program code stored in a program file for the map image search method. For example, the program file for the map image search method may be stored in the permanent storage device 130 of FIG. 1. The processor 110 may control the computer system 100, so that the program code may be loaded from the program file stored in the permanent storage device 130 to the memory 120 through the bus 140. Here, the processor 110 and the information input controller 210, the query input controller 220, the image searcher 230, and the search result provider 240 may be different functional representations of the processor 110 to execute an instruction of a portion corresponding to the program code loaded to the memory 120 and to implement operations S320 through 350, respectively. To perform operations S320 through S350, the processor 110 and the components of the processor 110 may directly process an operation in response to a control instruction or may control the computer system 100 to process the operation.

In operation S320, the information input controller 210 controls the computer system 100 to receive the context acquired from a corresponding image analysis result as image information about a map image. The information input receiver 210 may receive image information that is pre-matched to the map image. Here, the entire image or a portion of the image that is serviced as a panoramic photo, such as a street view, may be used for the map image. The image information may indicate contextual data that includes all of contextual relationships or correlations associated with the map image. For example, the image information may include the context of an image itself extracted from the image through an image recognition and analysis technology, a text recognized from the image using an optical character reader (OCR), and the like. The image information may be extracted by analyzing a natural image using a deep learning model, for example, a learning model based on Convolutional Neural Network (CNN) features. The recent image analysis technology through deep learning may acquire detailed image object features at a level of depicting the context of the image. Detailed features, for example, "the lion is sitting", "the lion is attacking a buffalo", etc., of the lion included in the image may be acquired by analyzing the image captured from the lion. That is, a result acquired by recognizing and processing the entire street view image may be stored as an image abstract text, for example, Img2Text, or a major meta tag, and may be matched to a corresponding street and map and thereby managed. In addition to the image context analysis, various texts included in in-image signboards, etc., may be converted using an OCR and thereby be used for map image search. The image information may be input to or received by the computer system 100 through the I/O interface 150 or the network interface 160, and may be stored and managed in the memory 120 or the permanent storage device 130.

In operation S330, the query input controller 220 controls the computer system 100 to receive a query for the map image search. For example, the query input controller 220 may receive a text-based keyword as the query, may receive an object query indicating a variety of things, for example, dog, cat, flower, vehicle, etc., included in the image as an object query, or may receive a sentence query prepared using a text indicating a detailed image object feature, for example, "coastal road along the sea", "square with many people", "wall of Seoul Nowon-gu with scribbled writing", "street photographed with Jaeseok Yoo", and the like. As another example, the query input controller 220 may receive a query in which location information and a keyword are combined. That is, the query input controller 220 may receive a sentence query in which a text indicating the image object feature and a text indicating the location information are combined. For example, the query input controller 220 may receive a keyword including location information, such as "wall of Seoul Nowon-gu with scribbled writing", "place with the largest number of pork restaurants within the 500-meter range", "hotel within 300 meters from the sandy beach", and the like. As another example, the query input controller 220 may receive an image as a query for map image search. In detail, the query input controller 220 may receive a corresponding photo as the query to retrieve a place in the photo or a place similar thereto. The query for the map image search may be input to or received by the computer system 100 through the I/O interface 150 or the network interface 160.

In operation S340, the image searcher 230 searches for a map image corresponding to the input query based on the context acquired from the image analysis result. The image searcher 230 may search for a map image based on context-based image information at a street view map service. For example, in response to an input of a sentence query, the image searcher 230 may search for a map image that corresponds to the sentence query in the context acquired from the image analysis result. When the sentence query is input as a keyword prepared using a text indicating a detailed image object feature, the image searcher 230 may search for a map image that corresponds to the image object feature included in the keyword in the context acquired from the image analysis result. As another example, when a query in which location information and a keyword are combined is input, the image searcher 230 may search for a map image that corresponds to the keyword from among images retrieved after searching a street view of the corresponding location information in the context acquired from the image analysis result, or may search for a map image that corresponds to an image object feature included in the keyword based on the location information combined with the keyword, in the context acquired from the image analysis result. As another example, when an image is input as a query for a map image search, the image searcher 230 may search for a map image that corresponds to the context of the image input as the query and in the context acquired from the image analysis result, or may search for a map image similar to the image input as the query through matching between images. Accordingly, the image searcher 230 may search for a context-based street view map image using image information, for example, Img2Text, a tag, etc., and an image recognition.

In operation S350, the search result provider 240 provides a service or content using the map image retrieved as a result of the search conducted in operation S340. For example, the search result provider 240 may sort the retrieved map images based on a predetermined criterion and may provide the sorted map images as search results corresponding to the query. As another example, the search result provider 240 may provide location information, for example, regional information, matched to a map image corresponding to a query as the search results, and may provide a map service of a street view associated with a specific location in response to an input of the specific location in the location information included in the search results. As another example, in response to a search in a virtual reality environment, the search result provider 240 may serve a street view including a map image corresponding to a query to be provided as a background environment of the virtual reality. Further, in addition to introducing the street view to the virtual reality environment, it is possible to perform various types of searches and uses, for example, to search for a map image of a street view corresponding to a predetermined criterion based on an image analysis result of the map image and to use the retrieved map image as advertising content, to search for a map image having specific context from among map images of the corresponding street view, and the like. In the case of using as the advertising content, a street image itself included in the search results may be applied as an advertisement, and an advertisement associated with a street image included in the search results may be included during a process of providing the street image to the user. The advertisement included in the search results may include an advertisement corresponding to the query, an advertisement associated with the street image included in the search results, and the like.

Any type of images provided from a map service may be used as a map image to be searched. As a representative example, a map image provided as a street view may be used as a search target. The map image of the street view may include location information, for example, GPS information, and may further include actual offline information. In addition, automatic geo tagging is possible for each image. In the case of performing an image analysis through deep learning, the context of an image may be acquired as image information and a result acquired by analyzing such street view images may be used for search, advertising, and the like. An image analysis result of a street view image of a specific region may be statistically analyzed and summarized as a feature of the corresponding specific region. Such summary information may be used for search, advertising, and the like. In particular, a street view image may be used in a search environment in which location information and a keyword are combined. For example, it is possible to search for "place with the largest number of pork restaurants within the 500-meter range", "hotel within 300 meters from the sandy beach", and the like.

FIGS. 4 through 8 illustrate examples of a street view search according to at least one example embodiment.

Figure 4:
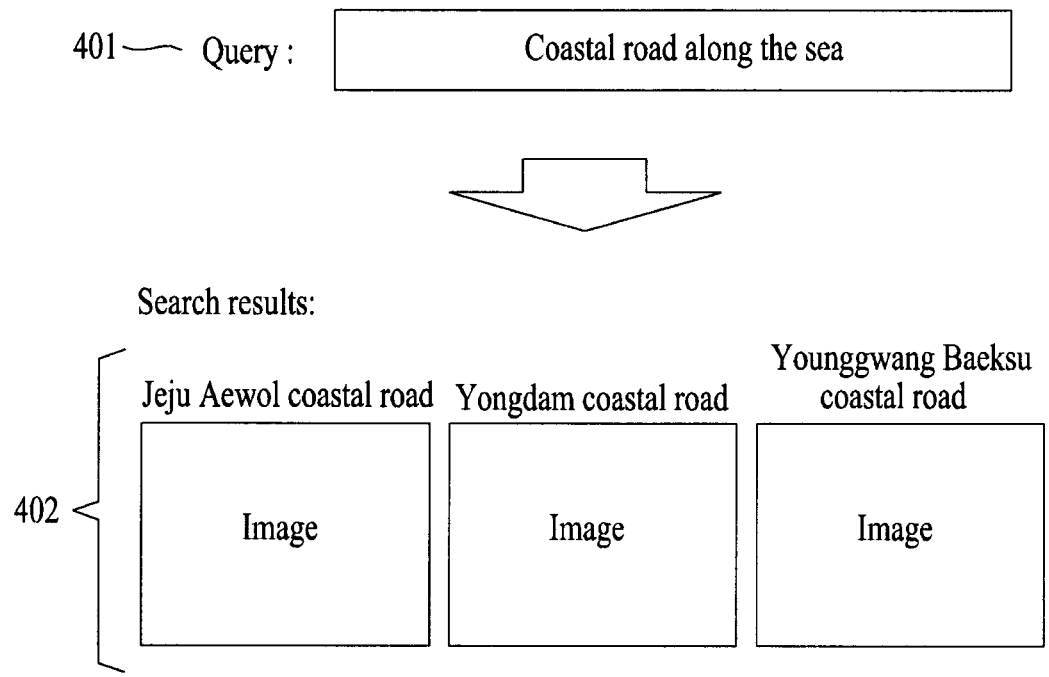

Referring to FIG. 4, in response to a keyword "coastal road along the sea" being input as a search query 401, the processor 110 may search for an image that includes context corresponding to "coastal road along the sea" acquired from an image analysis result and may provide, as search results 402, an image including the context of "coastal road along the sea" and images of regions, "Jeju Aewol coastal road", "Yongdam coastal road", "Younggwang Baeksu coastal road", etc., matched to the corresponding image.

Figure 5:
Figure 5:
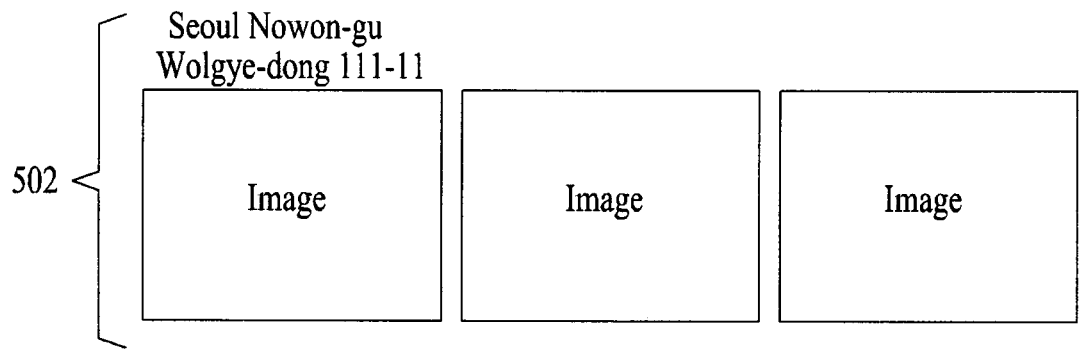

Referring to FIG. 5, in response to a keyword "wall of Seoul Nowon-gu with scribbled writing" being input as a query 501 in which location information is combined, the processor 110 may search for an image that includes context corresponding to "wall with scribbled writing" acquired an image analysis result from images of which location information is matched to "Seoul Nowon-gu" and may provide, as search results 502, an image including the context of "wall of Seoul Nowon-gu with scribbled writing" and images of regions, "Seoul Nowon-gu Wolgye-dong 111-11", etc., matched to the corresponding image.

Figure 6:
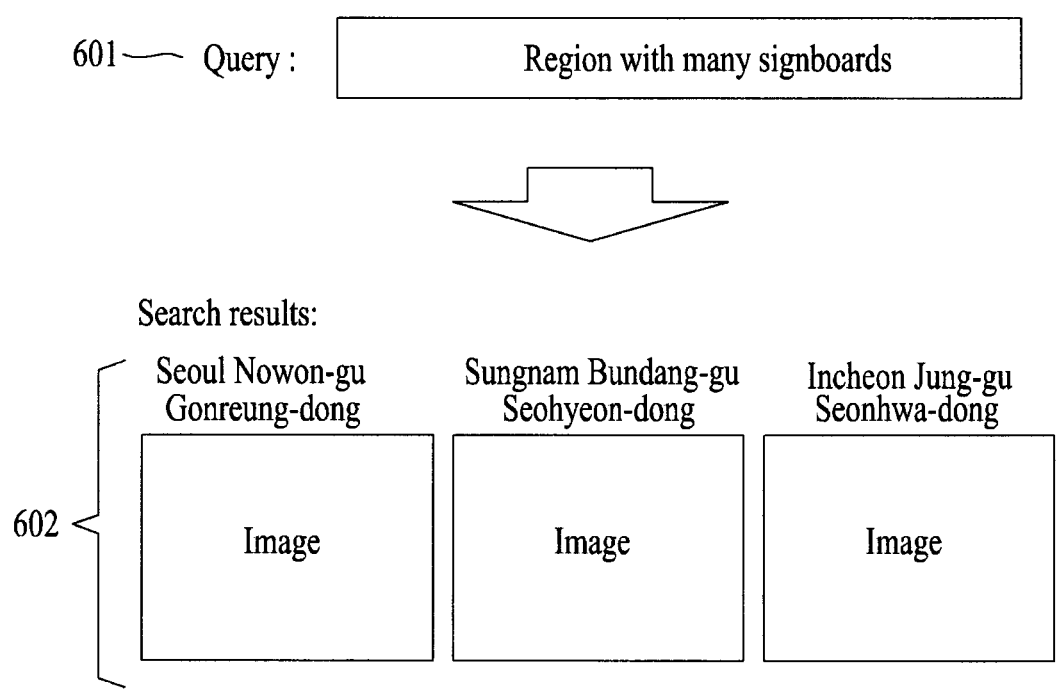

Referring to FIG. 6, in response to a keyword "region with many signboards" being input as a query 601, the processor 110 may search for an image that includes a predetermined number of or at least a predetermined ratio of regions of interest (ROIs) corresponding to a signboard in an image analysis result and may provide, as search results 602, an image including the context of "region with many signboards" and images of regions, "Seoul Nowon-gu Gonreung-dong", "Sungnam Bundang-gu Seohyeon-dong", "Incheon Jung-gu Seonhwa-dong", etc., matched to the corresponding image.

Figure 7:
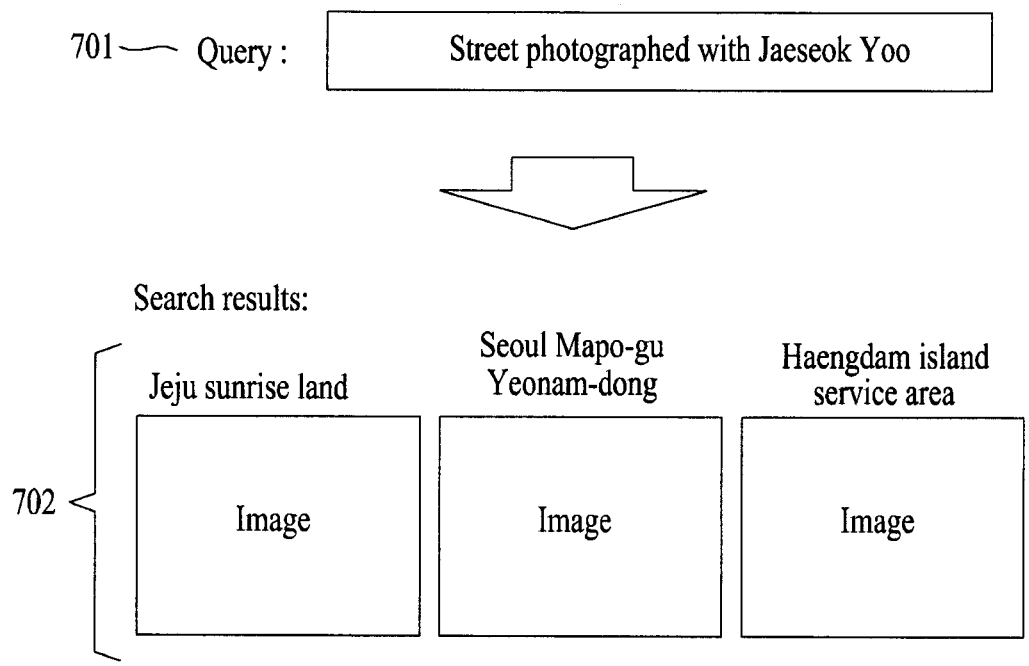

Referring to FIG. 7, in response to a keyword "street photographed with Jaeseok Yoo" being input as a query 701, the processor 110 may search for an image that includes context corresponding to "street photographed with Jaeseok Yoo" acquired from an image analysis result and may provide, as search results 702, an image including the context of "street photographed with Jaesok Yoo" and images of regions, "Jeju sunrise land", "Seoul Mapo-gu Yeonam-dong", "Haengdam island service area", etc., matched to the corresponding image.

Referring to FIG. 8, in response to an image, for example, a photo of a square with many people, being input as a query 801 for a street view search, the processor 110 may acquire the context of the image "square with many people" by performing an image analysis on the photo. The processor 110 may compare an image analysis result 803 of the photo input as the query 801 to the image analysis result of the image provided as a street view, and may search for an image that includes context corresponding to "square with many people" and may provide, as search results 802, images of regions, "Gwanghwamun Plaza, Seoul Jung-gu Sejong-ro", "Cheonggye Plaza, Seoul Jongro-gu Seorin-dong", etc., matched to the corresponding image.

As described above, a map image search system and a map image search method according to example embodiments may search for a street view image using an image analysis result and based on the context of an image.

According to some example embodiments, it is possible to provide and use further various and detailed map search environments by searching for a map image, such as a street view, based on a variety of information included in an image analysis result. Also, according to some example embodiments, it is possible to search for a map image corresponding to a detailed situation or characteristic based on an image analysis result of a map image, and to use an image provided at a map service in various fields, for example, a background environment of virtual reality, advertising content, and the like The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A map image search method performed by a map image search system configured as a computer, the method comprising:
creating context of each of a plurality of predetermined map images from a corresponding image analysis result of the predetermined map images as map image information;
storing the created context map image information;
receiving a query from a user for a search of a map image, the query including a text indicating location information of the map image combined with a text describing the context of the map image including a physical description of features of the map image in the location information;
searching, in a street map service, map images corresponding to the query using the stored map image information; and
providing to the user a street view image of at least one of the map images corresponding to the query found in the search in the street map service,
wherein the corresponding image analysis result of the map images includes a text recognized and extracted from the predetermined map images.

2. The method of claim 1, wherein the street view image is an image provided as a panorama.

3. The method of claim 1, wherein the receiving of the query comprises receiving a keyword combined with the location information or a keyword prepared as a sentence.

4. The method of claim 1, wherein the searching comprises searching for the map image of which location information corresponds to the location information input as the query, in response to a keyword combined with the location information being input as the query.

5. The method of claim 1, wherein the searching comprises searching for the map image of which the context corresponds to the text describing the context of the map image input as the query.

6. The method of claim 1, wherein the searching comprises searching for the map image of which an image analysis result corresponds to an image object feature included in the text describing the context of the map image, in response to the query.

7. The method of claim 1, wherein the providing comprises providing the street view image as a background environment of a virtual reality.

8. The method of claim 1, wherein the providing comprises providing the street view image as advertising content.

9. The method of claim 1, wherein the providing comprises providing the street view image by including advertising content associated with the query in the street view image.

10. A non-transitory computer-readable medium storing computer-readable instructions, wherein, when executed by a processor, the computer-readable instructions control a computer system to implement a map image search method comprising:
creating context of each of a plurality of predetermined map images from a corresponding image analysis result of the predetermined map images as map image information;
storing the created context map image information;
receiving a query from a user for a search of a map image, the query including a text indicating location information of the map image combined with a text describing the context of the map image including a physical description of features of the map image in the location information;
searching, in a street map service, map images corresponding to the query using the stored map image information; and
providing to the user a street view image of at least one of the map images corresponding to the query found in the search in the street map service,
wherein the corresponding image analysis result of the map images includes a text recognized and extracted from the predetermined map images.

11. A map image search system configured as a computer, comprising:
a memory unit for storing a computer-readable program;
a processor including a plurality of functional units for executing the program stored in the memory, the functional units comprising,
an information input controller configured to control the map image search system to receive context of each of a plurality of predetermined map images acquired from a corresponding image analysis result of the predetermined map images stored as map image information;
a query input controller configured to control the map image search system to receive a query from a user for a search of a map image, the query including a text indicating location information of the map image combined with a text describing the context of the map image including a physical description of features of the map image in the location information;
an image searcher configured to search, in a street map service, map images corresponding to the query using the stored map image information; and
a search result provider configured to provide to the user a street view image of at least one of the map image corresponding to the query found in the search in the street map service,
wherein the corresponding image analysis result of the map images includes a text recognized and extracted from the predetermined map images.

12. The map image search system of claim 11, wherein the query input controller is configured to receive a keyword combined with the location information or a keyword prepared as a sentence as the query.

13. The map image search system of claim 11, wherein the image searcher is configured to search for the map image of which an image analysis result corresponds to an image object feature included in the text describing the context of the map image, in response to the query.

* * * * *